(12) United States Patent
Santi

(10) Patent No.: US 9,027,732 B2
(45) Date of Patent: May 12, 2015

(54) UNIT FOR TRANSFERRING AND UP-ENDING SEALED PACKAGES OF POURABLE FOOD PRODUCTS

(75) Inventor: Franco Santi, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/979,607

(22) PCT Filed: Jan. 24, 2012

(86) PCT No.: PCT/EP2012/050995
§ 371 (c)(1),
(2), (4) Date: Jul. 12, 2013

(87) PCT Pub. No.: WO2012/101094
PCT Pub. Date: Aug. 2, 2012

(65) Prior Publication Data
US 2013/0284561 A1  Oct. 31, 2013

(30) Foreign Application Priority Data

Jan. 29, 2011  (EP) .................................... 11152630

(51) Int. Cl.
*B65G 47/248* (2006.01)
*B65G 47/84* (2006.01)

(52) U.S. Cl.
CPC ............ *B65G 47/248* (2013.01); *B65G 47/846* (2013.01)

(58) Field of Classification Search
CPC ..... B65G 47/24; B65G 47/248; B65G 47/252
USPC .......... 198/406, 408, 412, 413, 416, 417, 724
See application file for complete search history.

(56) References Cited

U.S. PATENT DOCUMENTS 2,952,567 A * 9/1960 Nordquist et al. ............ 427/232
2,984,337 A * 5/1961 Couch et al. .................. 198/441

(Continued)

FOREIGN PATENT DOCUMENTS

CN       1203881 A    1/1999
CN     101112919 A    1/2008

(Continued)

OTHER PUBLICATIONS

International Search Report (PCT/ISA/210) issued on Apr. 5, 2012, by the European Patent Office as the International Searching Authority for International Application No. PCT/EP2012/050995.

(Continued)

*Primary Examiner* — Leslie A Nicholson, III
*Assistant Examiner* — Keith R Campbell
(74) *Attorney, Agent, or Firm* — Buchanan Ingersoll & Rooney PC

(57) ABSTRACT

A unit for transferring and up-ending at least one sealed package containing a pourable food product and having a first axis, comprising: at least one push member which cooperates with package to feed it along a first path from an in-feed station to an out-feed station; the path extending about a second axis; the unit further comprising a guide cooperating with a first side of package along first path to up-end it from an in-feed position, in which it is positioned with first axis oriented in a first direction, to an out-feed position, in which it is positioned with first axis oriented in a second direction crosswise to first direction; and an anti-rotating mechanism cooperating with package along path to prevent package from rotating about first axis; an anti-rotating mechanism comprising a pressure element rotatable about second axis and adapted to cooperate, in use, with package.

18 Claims, 4 Drawing Sheets

(56) References Cited

U.S. PATENT DOCUMENTS

| | | | | |
|---|---|---|---|---|
| 4,050,570 A | * | 9/1977 | Kramer | 198/398 |
| 4,625,854 A | * | 12/1986 | Deichmann et al. | 198/416 |
| 5,096,042 A | * | 3/1992 | Loll | 198/441 |
| 5,373,934 A | * | 12/1994 | Jackson et al. | 198/803.8 |
| 5,765,675 A | * | 6/1998 | Draghetti et al. | 198/408 |
| 6,109,420 A | * | 8/2000 | Poppi et al. | 198/417 |
| 6,808,060 B1 | | 10/2004 | Giometti | |

FOREIGN PATENT DOCUMENTS

| | | |
|---|---|---|
| DE | 10 2008 004437 A1 | 4/2009 |
| EP | 0 887 268 A1 | 12/1998 |
| EP | 1 493 694 A2 | 1/2005 |
| GB | 1 019 242 A | 2/1966 |

OTHER PUBLICATIONS

Written Opinion (PCT/ISA/237) issued on Apr. 5, 2012, by the European Patent Office as the International Searching Authority for International Application No. PCT/EP2012/050995.

Chinese Office Action issued on Nov. 17, 2014, by the Chinese Patent Office, in corresponding Chinese Patent Application No. 201280006807.5, and English translation of Chinese Office Action (12 pages).

* cited by examiner

UNIT FOR TRANSFERRING AND UP-ENDING SEALED PACKAGES OF POURABLE FOOD PRODUCTS

The present invention relates to a unit for transferring and up-ending packages of pourable food products.

As is known, many pourable food products, such as beverages, fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally into a tube.

The tube is filled with the sterilized or sterile-processed food product, and is sealed and cut along equally spaced cross sections, so as to form pillow packs.

Packaging machines of the above type are known which comprises;
 a folding station where pillow packs are turned into folded packages by automatic folding units; and
 a unit for transferring and up-ending sealed packages of pourable food products.

More specifically, such a unit is arranged downstream from the folding station.

Furthermore, such a unit transfers the packages successively along a first path from an in-feed station to an out-feed station, and simultaneously up-end the packages from an in-feed position, in which the packages are positioned with their axis tilted roughly 15° to the horizontal, into an out-feed position, in which the packages are positioned with their axis substantially vertical.

Known units receive the packages at the in-feed station from a first conveyor, and feed them to a second conveyor at the out-feed station.

More specifically, the first conveyor supplies the unit with packages in the in-feed position, and the second conveyor withdraws the packages from the unit in the out-feed position.

Known units substantially comprise a rotary member having a number of push arms which cooperate with respective packages to push them along the first path; and a fixed guide extending substantially along the first path and cooperating with the packages to ease them from the tilted in-feed position to the out-feed position.

More specifically, the first path along which the packages are fed is substantially in the form of an arc of circumference, at the end of which, the packages are fed to an input of the second conveyor in a direction perpendicular to the out-feed direction of the packages from the packaging machine.

The second conveyor also comprises a fixed guide, and feeds the packages along a second path to orient the packages in a direction parallel to the out-feed direction of the packaging machine.

To do this, the second conveyor is in the form of a 90° arc.

Known units further comprise a fixed brush arranged along the first path and adapted to cooperate with the packages, as the latter are up-ended towards the out-feed position.

More in detail, the brush exerts a braking action onto the packages. In this way, packages, especially those having a square or slightly rounded section, are prevented from rotating about their own axis, as they are moved from the in-feed to the out-feed position.

As a result, there is substantially no risk that a turned package stops along the first path and causes the stop of the unit and, therefore, of the whole packaging machine.

Though efficient, units of the above type leave room for improvement.

As a matter of fact, the brush comprises a plurality of bristles which, due to the interaction with packages, worn out.

As a result, there is the risk that the brush could reduce its effectiveness in braking the packages and, therefore, in preventing packages from rotating about their own axes.

In other words, the wear reduces the lifetime of the brush.

Furthermore, the distance between the bristles is on the order of 0.1 millimeter. Therefore, the washing of the bristles is difficult and not completely efficient. As a result, there is the risk that the brush dirties the package.

It is an object of the present invention to provide a unit for transferring and up-ending at least one sealed package of a pourable food product, designed to provide a straightforward, low-cost solution to at least one of the aforementioned drawbacks typically associated with known units.

According to the present invention, there is provided a unit for transferring and up-ending at least one sealed package of a pourable food product, as claimed in claim 1.

A preferred, non-limiting embodiment of the present invention will be described by way of example with reference to the attached drawings, in which.

Figure 1:
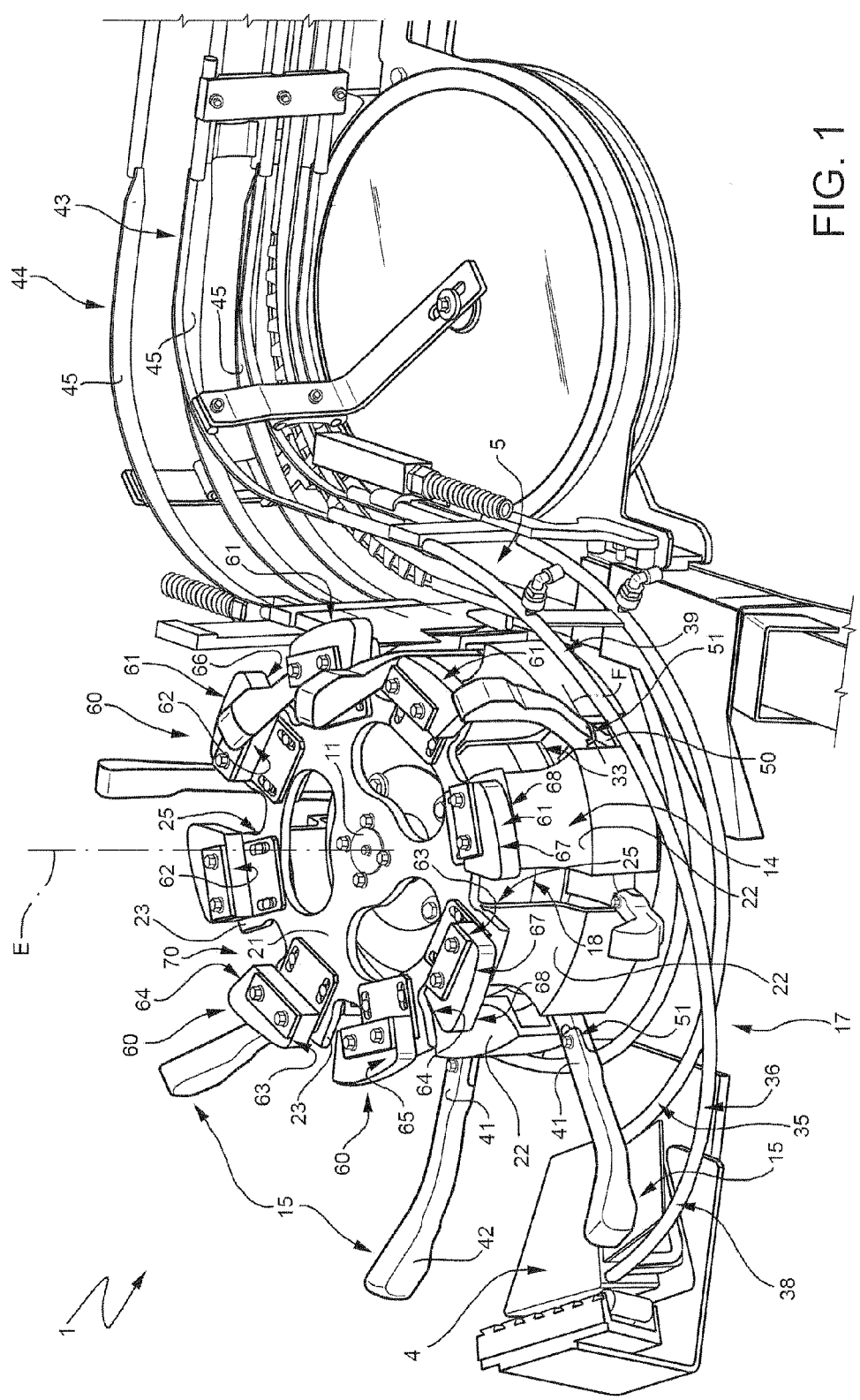
FIG. 1 shows a perspective view, with parts removed for clarity, of a unit for transferring and up-ending sealed packages of pourable food products in accordance with the present invention.

Number 1 in the attached drawings indicates as a whole a unit for transferring and up-ending sealed, parallelepiped-shaped packages 2 of food products, such as beverages, fruit juice, semiliquid products, and pourable food products in general. More specifically, each package 2 may be fitted with known external opening means (not shown), and has an axis A.

Unit 1 is preferably designed for use on an automatic packaging machine (not shown as a whole) for producing packages 2 of food products from laminated strip packaging material, and defines a work station of the packaging machine.

Unit 1 feeds a succession of packages 2 continuously along a path P extending from an in-feed station 4 to an out-feed station 5, and simultaneously up-ends packages 2 continuously from an in-feed position, in which they are positioned with respective axes A oriented in a direction B, into an out-feed position, in which they are positioned with respective axes A oriented in a direction C crosswise to direction B.

With reference to the embodiment shown, direction B is slightly sloped relative to a horizontal plane and direction C is vertical.

Package 2 substantially comprises:
- a top and a bottom faces 3a, 3b opposite and parallel to each other, and orthogonal to axis A;
- a pair of lateral faces 6a, 6b opposite to each other, both parallel to axis A, and orthogonally interposed between faces 3a, 3b; and
- a pair of additional lateral faces 7a, 7b opposite to each other, both parallel to axis A, and orthogonally interposed between faces 3a, 3b and faces 6a, 6b.

More specifically, unit 1 receives packages 2 continuously and successively at station 4 from a not shown upstream conveyor, and feeds them, in the out-feed position, to a conveyor 8 at out-feed station 5.

Upstream conveyor performs a number of folding operations to form packages 2, and feeds them along a path terminating at station 4 where packages 2 are picked up by unit 1.

Figure 2:
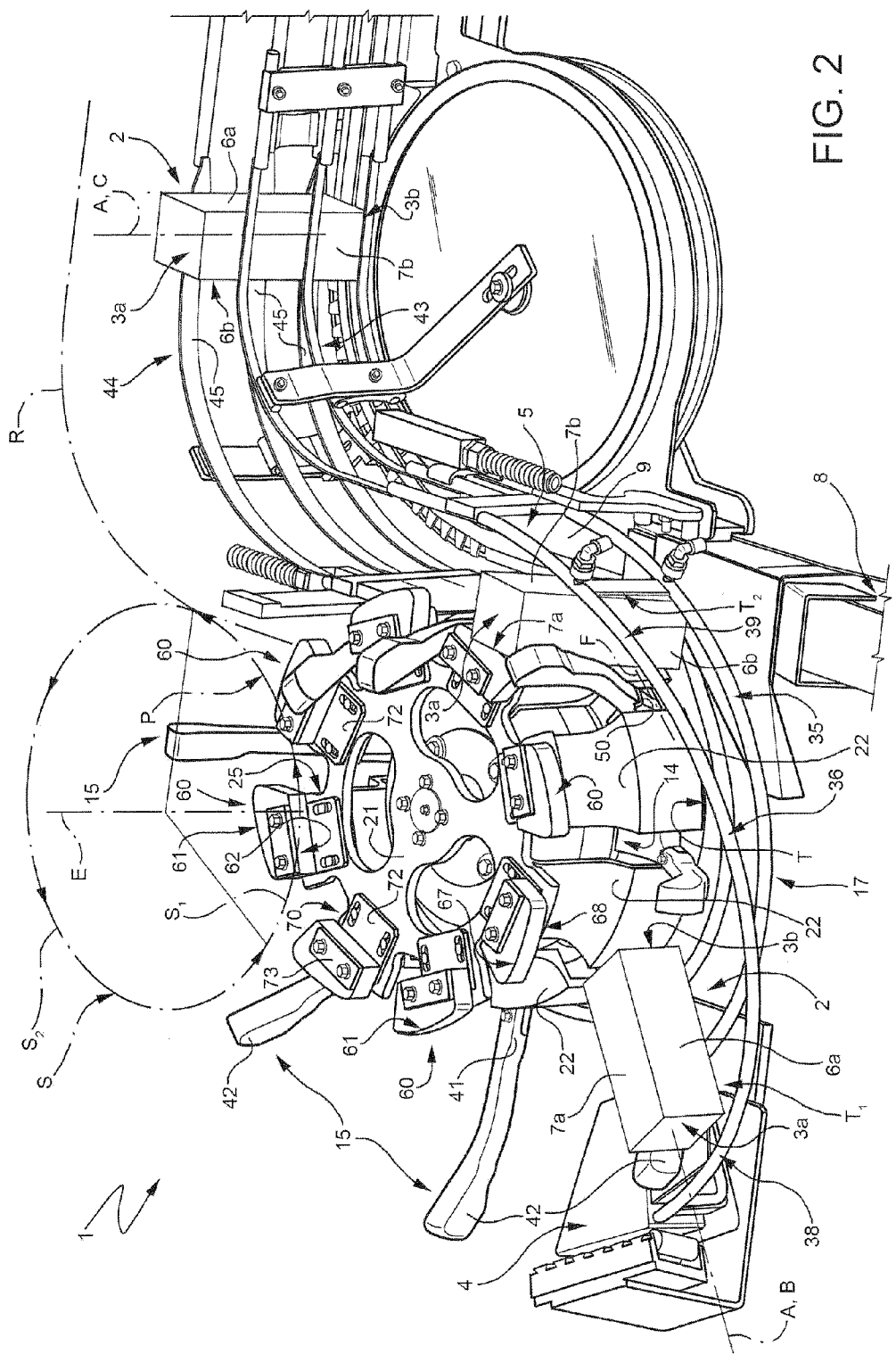
FIG. 2 shows the unit of FIG. 1 together with packages to be transferred and up-ended.

At station 5, unit 1 feeds packages 2 successively onto belt conveyor 8 (known and not described in detail) and along a substantially straight path R tangent to an end portion of path P. More specifically, station 5 is defined by an intermediate portion of a top forward branch 9 of the belt of conveyor 8, onto which packages 2 are fed successively at the end of path P (FIG. 2).

Conveyor 8 defines, on the opposite side of station 5, an output of the packaging machine in a manner not shown, and so conveys packages 2, in the out-feed position, off the packaging machine.

Unit 1 substantially comprises a number of push arms 15 for removing respective packages 2 from upstream conveyor at station 4, and feeding them along path P to station 5; and a guide 17 which cooperates with packages 2 along path P to up-end them from the in-feed position to the out-feed position.

Path P is arc-shaped about an axis E parallel to direction C, and extends along an angle of about 90° from station 4 to station 5.

Unit 1 also comprises:
- a drive shaft 11 rotating continuously about axis E and powered by an electric motor of the packaging machine in known manner not shown; and
- a wheel 14 of axis E, fitted to shaft 11 rotatably about axis E, and comprising a number of members 50 hinged to wheel 14 and fixed releasably to respective push arms 15.

In detail, wheel 14 is substantially drum-shaped and comprises:
- a top disk 21 which has a through hole engaged by shaft 11; and
- a plurality of axial expansions 22 downwardly protruding from relative spokes 23 of top disk 21.

In the embodiment shown, wheel 14 defines integrally disk 21 and expansions 22.

Furthermore, in the embodiment shown, expansions 22 are angularly equi-spaced.

Disk 21 comprises a plurality of axially through slots 25 which are alternate to spokes 23.

In detail, each slot 25 is circumferentially interposed between two consecutive spokes 23 and viceversa.

Slots 25 are engaged by respective members 50 and have respective axes parallel to axis E.

Slots 25 and expansions 22 are eight, in the embodiment shown.

Figure 5:
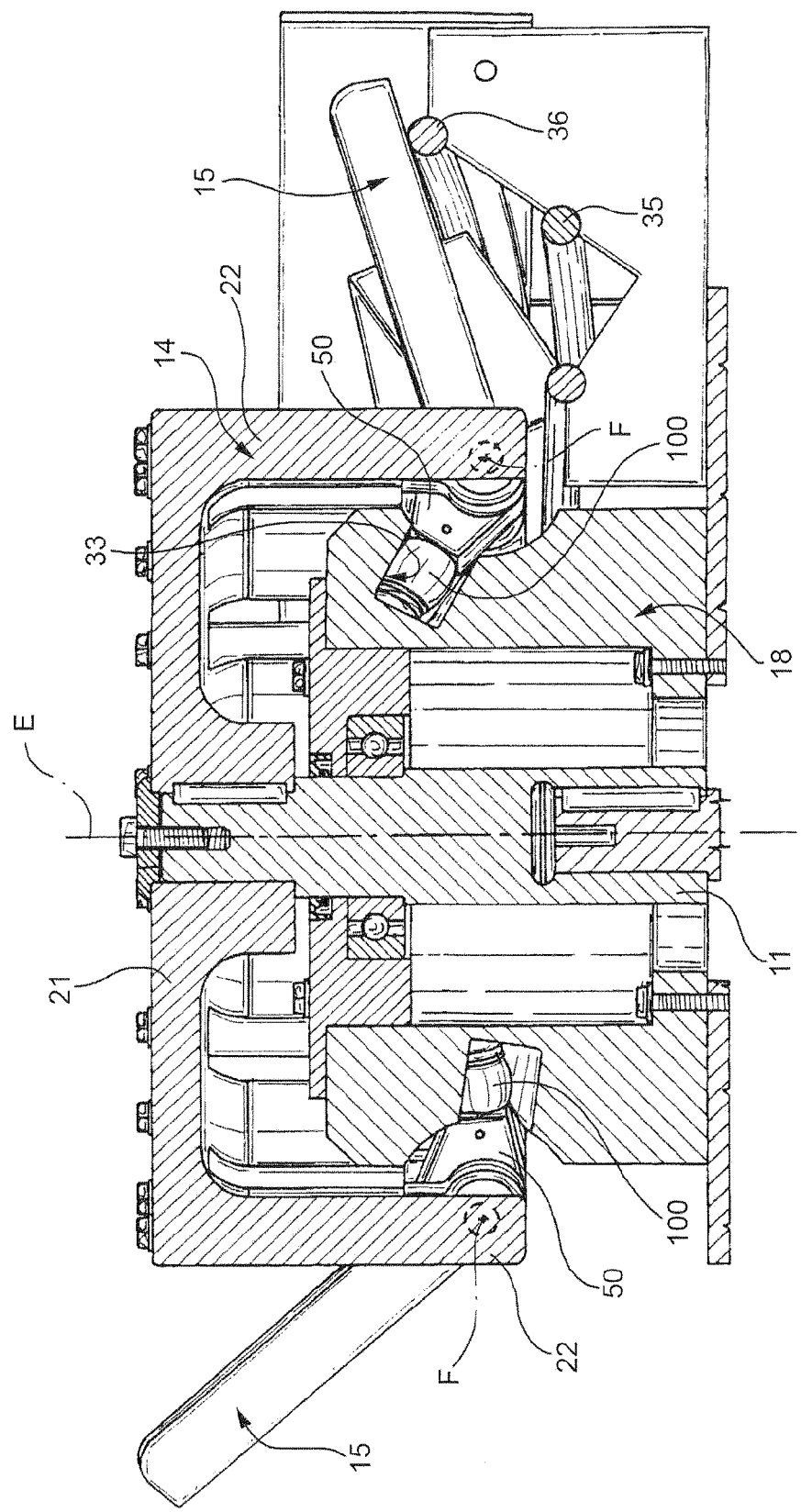
FIG. 5 shows a larger axial section of some components of the unit of FIGS. 1 and 2.

Each member 50 is hinged to wheel 14 to rotate with respect to wheel 14 about a respective further axis F perpendicular to axis E, and to rotate about axis E integrally with wheel 14 (FIGS. 2 and 5).

More specifically, members 50 pass through relative slots 25.

Each member 50 defines, at one end, a cam follower surface 100 (FIG. 5) which slides inside a groove 33 of a cam 18 stationary relative to axis E; and, at the opposite end, a prismatic seat 51 open on the opposite side to axis E and connected releasably to an end portion 41 of relative arm 15.

By means of respective member 50, wheel 14 thus moves each push arm 15 along a circular path S having a portion $S_1$ in common with path P.

More specifically, push arms 15 and members 50 are equally spaced about axis E, and are eight in number in the embodiment shown.

Each push arm 15 projects from respective member 50, and comprises, at the opposite end to portion 41, a flat end portion 42.

Portion 42 defines a flat surface which cooperates with face 6b of relative package 2 to feed it along path P (FIG. 2).

Portions 41, 42 of each push arm 15 are elongated in respective directions inclined with respect to each other.

Figure 3:
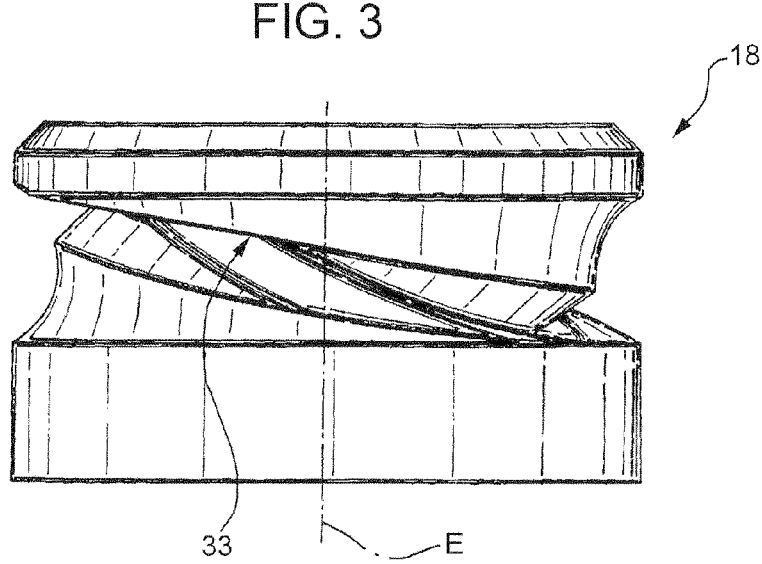
FIG. 3 shows a side view of a detail of the unit of FIGS. 1 and 2.

Cam 18 (FIGS. 2 and 3) is supported in a fixed position with respect to axis E by a fixed structure of the packaging machine, and cooperates with each member to move relative push arm 15, along portion $S_1$ of path S in common with path P, from a first operating position interacting with and pushing respective package 2, to a second operating position releasing package 2, and to move relative push arm 15, along the remaining portion $S_2$ of path S, from the second operating position to the first operating position.

More specifically, in the first operating position, each push arm 15 is located at station 4, with portion 42 parallel to direction B; and, in the second operating position, push arm 15 is located at station 5, with portion 42 parallel to direction C and detached from relative package 2.

For unit 1 to work properly, portion 42 of each push arm 15 (FIG. 2) is positioned parallel to axis A of relative package 2 along path P.

More specifically, each push arm 15 is of maximum radial extension with respect to axis E in the first operating position, and is contained within the radial extension of respective slot 25 in the second operating position.

Groove 33 of cam 18 defines a continuous constraint for the cam follower surfaces 100 of members 50, and, from the first to the second operating position, defines a continuous succession of intermediate positions in which each push arm 15 interacts with and pushes relative package 2, and in which portion 42 of each push arm 15 is eased from direction B to direction C.

Cam 18 is fitted through loosely with shaft 11, is contained within the radial extension of wheel 14, and is interposed radially, with respect to axis E, between shaft 11 and arms 15.

Groove 33 of cam 18 is located along the radially outer periphery of the cam, is annular shaped, and is engaged in sliding manner by the cam follower surfaces 100 of members 50.

More specifically, groove 33 extends at varying radial distances from axis E to move members 50, and hence arms 15, cyclically towards and away from axis E.

Guide 17 is curved, extends substantially along path P, on the outside of wheel 14, and cooperates with packages 2 to ease them from the in-feed to the out-feed position.

Furthermore, guide 17 defines a supporting and slide surface T for packages 2, which extends substantially along path P and slopes gradually from a portion $T_1$, parallel to direction B and adjacent to station 4, to a substantially flat, vertical out-feed portion $T_2$ parallel to direction C and adjacent to station 5.

More specifically, guide 17 comprises two side by side, curved cylindrical sections 35, 36, which define surface T, and along which slide faces 7b of packages 2.

One (35) of said sections is substantially arc-shaped, of axis E, between stations 4 and 5, and extends beyond station 5 substantially along path R; while, from station 4 to station 5, the other section 36 slopes upwards from a receiving portion 38, of axis E, to a substantially straight portion 39 where packages 2 are unloaded onto conveyor 8.

More specifically, portion 38 of section 36 is located radially outwards of section 35 at station 4, and portion 39 is located over and aligned with section 35 at station 5.

Furthermore, portion 38 extends at decreasing radial distance from axis E and portion 39 extends at constant radial distance from axis E, proceeding from station 4 to station 5.

Each package 2 is therefore positioned, along path P, with its face 7b resting on sections 35, 36, and is finally oriented by sections 35, 36 to ease faces 3a, 3b orthogonal to axis E.

Finally, from station 5, section 36 extends, parallel to section 35, substantially along path R, and defines, with section 35, a lateral retaining guide 43 for retaining packages 2 along conveyor 8. On the opposite side, and also from station 5, packages 2 are retained by a further lateral retaining guide 44 extending parallel to retaining guide 43 and also defined by three parallel, curved flat sections 45.

Unit 1 also comprises anti-rotating means which cooperate with packages 2 along path P to prevent packages 2 from rotating about their own axes A.

Figure 4:
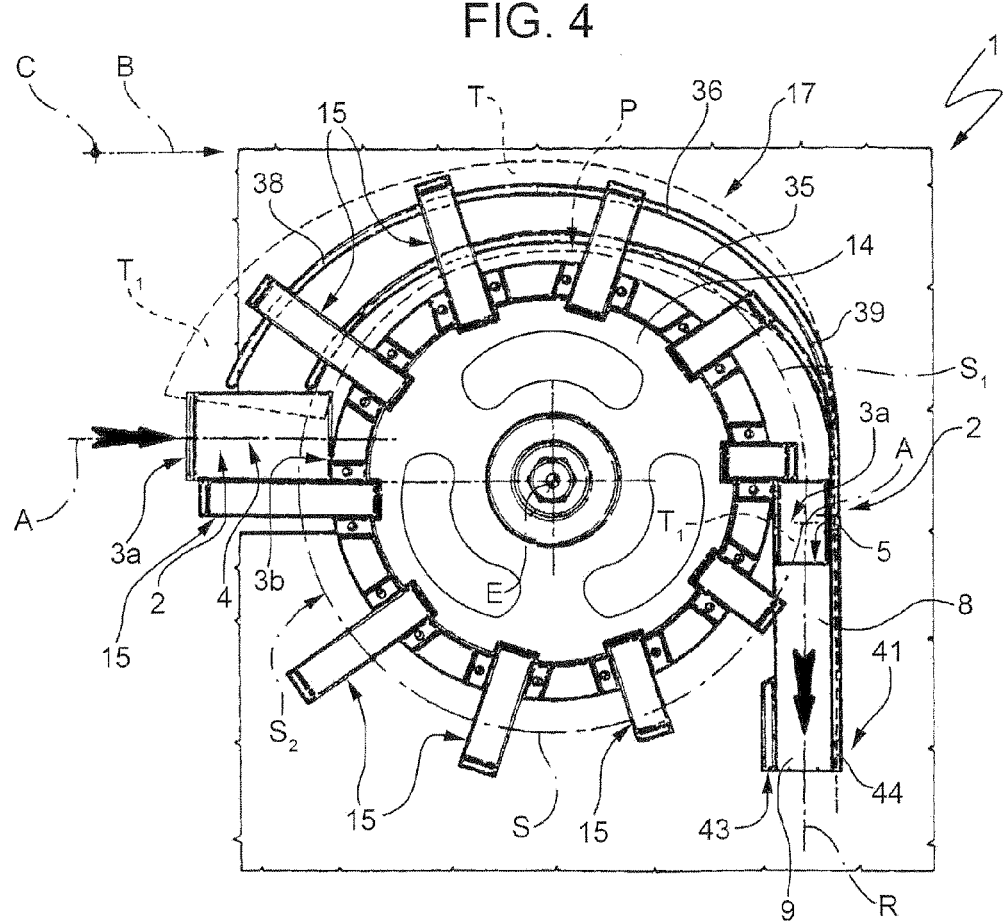
FIG. 4 shows a schematic top view, with parts removed for the sake of clarity, of the unit of FIGS. 1 and 2.

Advantageously, anti-rotating means comprise a plurality of pressure elements 60 (not shown in FIG. 4 for the sake of clarity) rotatable about axis E and cooperating with face 7a of corresponding packages 2.

More precisely, pressure elements 60 are fitted to relative spokes 23 of disk 21.

Pressure elements 60 and push arms 15 are alternate to each other, proceeding circumferentially about axis E.

In this way, pressure elements 60 are driven in rotation about axis E by wheel 14.

Furthermore, the angular speed of pressure elements 60 equals the angular speed of push arms 15 about axis E.

In detail, each pressure element 60 substantially comprises:
- a radially outer surface 61 opposite to axis E, cooperating, in use, with face 7a of corresponding package 2 to be pushed;
- a radially inner flat surface 62 opposite to surface 61;
- a pair of surfaces 63, 64 opposite to each other and interposed between surfaces 61, 62;
- a top flat surface 65; and
- a bottom flat surface 66 axially opposite to surface 65.

Surface 63 precedes surface 64, proceeding according to the rotation sense of wheel 14 about axis E.

Surface 61 is bounded by a top edge 67 and a bottom edge 68 opposite to each other and extending both between surfaces 63, 64.

In the embodiment shown, edges 67, 68 are curved.

More precisely, edges 67, 68 extend at decreasing distances from axis E, proceeding according to the rotation sense of wheel 14 about axis E.

As surface 61 of each pressure element 60 cooperates with face 7a of relative package 2, section 39 of guide 70 cooperates with face 7b of relative package 2.

In the above conditions, pressure elements 60 exert a pressure onto the corresponding packages 2, so as to prevent the rotation thereof about relative axes A.

In detail, such a pressure generates a force onto the packages 2 directed on the side opposite to axis E.

Unit 1 also comprises a plurality of support element 70 (FIG. 2) for fitting relative pressure elements 60 to disk 21.

In detail, each support element 70 is formed by a pair of plates 72, 73.

Plates 72, 73 of each support element 70 are parallel to each other and clamp relative pressure element 60 parallel to axis E.

In particular, plate 72 of each support element 70 is fitted to disk 21 and cooperates with surface 66 of relative pressure element 60.

Plate 73 of each support element 70 cooperates with surface 65 of relative pressure element 60 and is screwed to relative pressure element 60.

Pressure elements 60 are made of an elastomeric material.

Preferably, the elastomeric material is a cellular elastomer.

In the embodiment shown, the cellular elastomer is silicone.

Operation of unit 1 will now be described with reference to one package 2 and to one pressure element 60, and as of a cycle-start condition, in which one of push arms 15 is set to the first operating position, alongside and upstream from package 2 along path P (FIG. 2).

Push arm 15 removes package 2 from upstream conveyor at station 4.

In this condition, axis A of package 2 is parallel to direction B and face 7b rests onto sections 35, 36 of guide 17.

As wheel 14 rotates about axis E, package 2 is pushed by respective push arm 15 along sections 35, 36 at portion $T_1$ of surface T.

By virtue of the design of sections 35, 36, package 2, as wheel 14 rotates about axis E, is eased into the out-feed position, and in particular, is gradually up-ended to ease face 3b of package 2 onto conveyor 8 as of station 5.

As wheel 14 rotates, the cam follower surface 100 of member 50 slides along groove 33, so as to gradually raise push arm 15 into the second operating position.

The rotation of wheel 14 drives in rotation pressure element 60 about axis E at the same rotational speed of push arm 15 and, therefore, of packages 2.

As it travels along path P, push arm 15 is rotated by cam 18 relative to wheel 14 and about axis F, so as to adapt the extension direction of portion 42 to the tilt of axis A of package 2. In this way, push arm 15 is set into the best condition in which to push package 2.

As a result, package 2 travels along path P, along an arc of circumference about axis E, to station 5.

In a first portion of path P, surface 61 of pressure element 60 is radially detached from corresponding package 2.

Immediately upstream from station 5, face 7a of package 2 contacts surface 61 of pressure element 60.

In this condition, section 39 of guide 17 cooperates with face 7b of relative package 2.

In detail, surface 61 exerts on face 7a a pressure which results in a force directed on the opposite side of axis E.

Being forced between pressure element 60 and section 39 of guide 17, package 2 is prevented from rotating about axis A.

By the time it reaches station 5, push arm 15 is set by groove 33 into the second operating position, detached from package 2, which is fed onto conveyor 8 and by this along path R.

As wheel 14 continues rotating, push arm 15 is gradually moved from the second to the first operating position by the cam follower surface 100 of member 50 sliding along groove 33.

The advantages of unit 1 according to the present invention will be clear from the foregoing description.

In particular, pressure elements 60 not only prevent packages 2 from rotating about relative axes A, but also rotate about axis E at the same angular speed of push arms 15 and packages 2.

Therefore, the rotation of package 2 is prevented substantially without generating any friction between pressure elements 60 and corresponding packages 2, as they contact each other.

Accordingly, pressure elements 60 are substantially not affected by wear problems and their lifetime is consequently dramatically improved.

Furthermore, surface 61 is very easy to clean when compared with the brush described in the introductory part of the present description.

As a result, the overall hygiene of the packages 2 processed by unit 1 is highly improved.

Being made of a cellular elastomer, pressure elements 60 tends to not absorb external impurities and can be washed in a particularly easy way.

Clearly, changes may be made to unit 1 according to the present invention without, however, departing from the scope as defined in the accompanying Claims.

The invention claimed is:

1. A unit for transferring and up-ending at least one sealed package containing a pourable food product and having a first axis; said unit comprising:
    a rotatable wheel possessing an outer surface;
    at least one push member which cooperates with said package to feed it along a first path from an in-feed station to an out-feed station, the at least one push member being connected to and rotatable together with the wheel; said path extending about a second axis;
    guide means which cooperate with a first side of said package along said first path to up-end said package from an in-feed position, in which said package is positioned with said first axis oriented in a first direction, to an out-feed position, in which said package is positioned with said first axis oriented in a second direction crosswise to said first direction; and
    anti-rotating means which cooperate with said package along said path to prevent said package from rotating about said first axis;
    wherein said anti-rotating means comprise at least one pressure element rotatable about said second axis and adapted to cooperate, in use, with said package, the at least one pressure element being connected to the wheel and projecting away from the outer surface of the wheel.

2. The unit of claim 1, wherein said pressure element is radially interposed between said guide means and said second axis, and cooperates, in use, with a second side, distinct from said first side, of said package.

3. The unit of claim 2, wherein said pressure element comprises:
    a first edge;
    a second edge axially opposite to said first edge; and
    a surface which is axially bounded by said first and second edges and cooperates, in use, with said second side of said package.

4. The unit of claim 3, wherein said first and second edges are curved.

5. The unit of claim 3, wherein the radial distance of said first and second edge from said second axis is decreasing, proceeding according to the sense of rotation of said pressure element about said second axis.

6. The unit of claim 1 comprising a wheel rotatable about said second axis;
    said pressure element and said push member being rotatable about said second axis integrally to said wheel.

7. The unit of claim 2, wherein said guide comprises at least an element which comprises, in turn, a first section extending at decreasing radial distances from said second axis and a second section which extends at constant radial distance from said second axis, proceeding from said in-feed station towards said out-feed station;
    said pressure element cooperating, in use, with said second side when said second section cooperates, in use, with said first side.

8. The unit of claim 1, comprising a plurality of said push members and a plurality of said pressure element;
    each said pressure element being circumferentially interposed between two consecutive said push members, with reference to said second axis.

9. The unit of claim 6, comprising a support element fitted to said pressure element and to said wheel.

10. The unit of claim 1, wherein said pressure element is made of an elastomeric material.

11. The unit of claim 10, wherein said elastomeric material is a cellular elastomer.

12. The unit of claim 11, wherein said cellular elastomer is silicone.

13. A packaging machine for producing sealed packages containing a pourable food product and having a first axis, comprising:
    a folding station;
    a unit receiving, in use, said sealed packages from said folding station at an in-feed station to transfer and up-end the sealed packages;
    a conveyor receiving, in use, said sealed packages from said unit at said an out-feed station; and
    the unit comprising:
        a rotatable wheel possessing an outer surface;
        at least one push member which cooperates with the packages to feed the packages along a first path from the in-feed station to the out-feed station, the at least one push member being connected to and rotatable together with the wheel, the path extending about a second axis;
        guide means which cooperate with a first side of the package along the first path to up-end the package from an in-feed position, in which the package is positioned with the first axis oriented in a first direction, to an out-feed position, in which the package is positioned with the first axis oriented in a second direction crosswise to the first direction;

anti-rotating means which cooperate with the package along the path to prevent the package from rotating about the first axis; and wherein the anti-rotating means comprise at least one pressure element rotatable about the second axis and adapted to cooperate, in use, with the package, the at least one pressure element being connected to the wheel and projecting away from the outer surface of the wheel.

14. A unit for transferring and up-ending at least one sealed package containing a pourable food product and having a first axis, the unit comprising:
   a rotatable wheel possessing an outer surface and rotatable about a second axis;
   at least one push member connected to and rotatable together with the wheel to cooperate with at least one of the sealed packages to move the sealed package along a first path from an in-feed station to an out-feed station;
   a guide configured to cooperate with a first side of the at least one package along the first path to up-end the at least one package from an in-feed position in which the at least one package is positioned so that the first axis is oriented in a first direction, to an out-feed position in which the at least one package is positioned so that the first axis is oriented in a second direction crosswise to the first direction; and
   a pressure element fixed to the wheel to rotate together with the wheel, the pressure element possessing a radially outer surface projecting outwardly beyond adjacent portions of the outer surface of the wheel and configured to contact the at least one package moving along the path to prevent the at least one package from rotating about the first axis.

15. The unit of claim 14, wherein the pressure element includes oppositely facing top and bottom surfaces, and wherein the wheel includes a top surface, the pressure element being connected to the wheel so that a portion of the bottom surface of the pressure element faces the top surface of the wheel.

16. The unit of claim 14, wherein the pressure element includes a radially inner surface opposite the radially outer surface, a pair of side surfaces that are opposite one another and interposed between the radially inner and outer surfaces, and oppositely facing top and bottom surfaces.

17. The unit of claim 14, wherein the pressure element is made of an elastomeric material.

18. The unit of claim 14, wherein a plurality of the pressure elements are fixed to the wheel in a circumferentially spaced apart manner, each of the pressure elements possessing a radially outer surface configured to contact respective ones of the packages along the path to prevent the packages from rotating about the first axis, the radially outer surface of each of the pressure elements projecting outwardly beyond adjacent portions of the outer surface of the wheel.

* * * * *